Dec. 29, 1925.

D. J. RIBISI

GROUSER

Filed March 26, 1925

1,567,465

INVENTOR
Dominic J. Ribisi
BY John A. Naismith
ATTORNEY

Patented Dec. 29, 1925.

1,567,465

UNITED STATES PATENT OFFICE.

DOMINIC J. RIBISI, OF NEAR SAN JOSE, CALIFORNIA.

GROUSER.

Application filed March 26, 1925. Serial No. 18,496.

*To all whom it may concern:*

Be it known that I, DOMINIC J. RIBISI, a citizen of the United States, and residing near San Jose, in the county of Santa Clara and State of California, have invented certain new and useful Improvements in Grousers, of which the following is a specification.

This invention relates particularly to a novel form of grouser particularly adapted for use on the drive wheels of tractors.

It is one object of the invention to provide a grouser so formed and constructed as to be readily reversible on the tractor wheel. That is, it is provided with two substantially symmetrical portions, either of which may be used as a base by means of which the device is mounted upon a wheel, or as a traction part extending radially from the wheel rim for engagement with the ground.

It is another object of the invention to provide a device of the character indicated that will be simple in form and construction, economical to manufacture, and highly efficient in its practical application.

In the drawing:—

Figure 1:
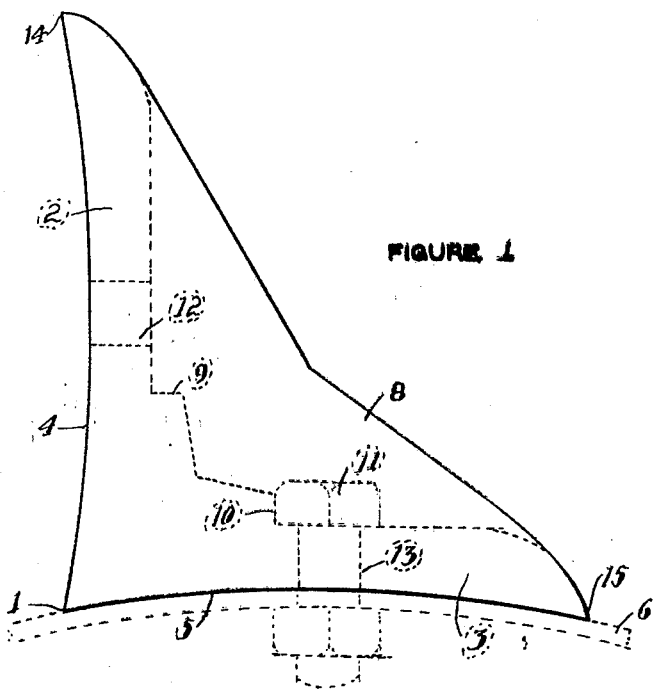
Figure 1 is a side elevation of my improved grouser.
Figure 2:
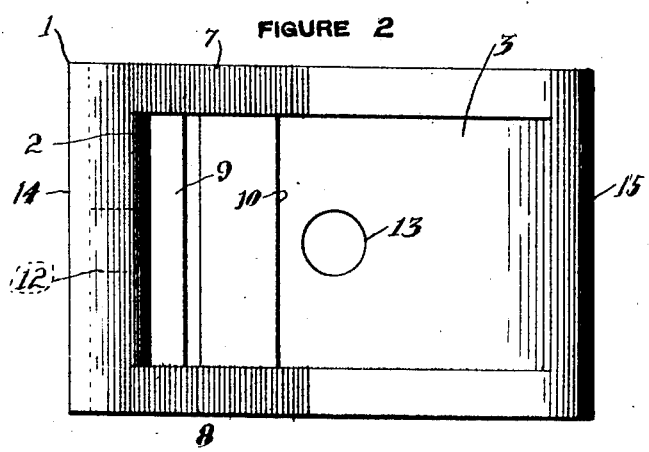
Figure 2 is a plan view of the same.

Referring now more particularly to the drawing, I show at 1 a single integrally formed casting having the following characteristics.

Two base walls 2 and 3 are formed at right angles to each other and similarly curved as at 4 and 5 respectively to engage the outer curved surface of a wheel rim, a portion of the latter being indicated in dotted lines at 6.

These base walls 2 and 3 are connected by side walls 7 and 8 and are provided with shoulders as 9 and 10 near their connecting ends to engage the head of a bolt 11 and prevent rotation of the same.

At 12 and 13 are indicated holes provided in base walls 2 and 3 whereby the device may be mounted upon the wheel rim 6.

Assuming the device to be mounted upon rim 6 as shown in Figure 1 it may be left in that position until its period of effective usefulness in that position has expired, whereupon the bolt 11 may be removed, the grouser turned to bring base wall 2 into engagement with the rim 6 and the bolt replaced in the rim 6 through hole 12.

It may now be readily seen that by means of this construction the efficient life of the grouser is doubled, and this without in any way increasing its initial cost. Furthermore, the curving of the base walls 2 and 3 not only adapts it for reversal on the rim but also provides more effective cutting edges at 14 and 15 and consequently increases its value as a traction element.

It is to be understood, of course, that while I have herein shown and described but one specific embodiment of the invention, changes in form, construction and method of application may be made within the scope of the appended claim.

I claim:—

A grouser comprising a casting having the following characteristics: base walls arranged at right angles to each other and curved to engage the perimeter of a wheel rim, side walls joining the base walls, the angle between the base walls and extending to both side walls being of increased thickness and forming shoulders extending transversely of said base walls, the said base walls being provided with bolt holes adjacent to said shoulders whereby bolts placed therein will engage said shoulders and be held against rotation thereby.

DOMINIC J. RIBISI.